United States Patent
St-Germain et al.

(10) Patent No.: US 6,598,708 B2
(45) Date of Patent: Jul. 29, 2003

(54) TAPERED ROLLER SCREW APPARATUS AND ITS DRIVEN DEVICE

(75) Inventors: André St-Germain, St-Bonaventure (CA); Luc Tessier, St-Nicéphore (CA)

(73) Assignee: Les Produits Fraco Ltee, Quebec (CA)

( * ) Notice: Subject to any disclaimer, the term of this patent is extended or adjusted under 35 U.S.C. 154(b) by 107 days.

(21) Appl. No.: 09/760,717

(22) Filed: Jan. 17, 2001

(65) Prior Publication Data
US 2001/0002634 A1 Jun. 7, 2001

Related U.S. Application Data

(63) Continuation-in-part of application No. 09/114,923, filed on Jul. 14, 1998, now abandoned.

(51) Int. Cl.⁷ .................................. E04G 1/20
(52) U.S. Cl. .................... 187/271; 187/250; 187/268; 74/424.6; 182/142
(58) Field of Search ................. 187/214, 267, 187/268, 271; 74/424.6, 465; 182/141, 148, 130, 131

(56) References Cited

U.S. PATENT DOCUMENTS

| | | | | |
|---|---|---|---|---|
| 647,491 A | * | 4/1900 | Hoffmann | 74/465 |
| 696,994 A | * | 4/1902 | Modry | 187/271 |
| 698,738 A | * | 4/1902 | Roney | 187/271 |
| 1,539,761 A | * | 5/1925 | Murray | 187/267 X |
| 1,953,772 A | * | 4/1934 | Phillips | 187/271 |
| 4,274,296 A | | 6/1981 | Miller et al. | |
| 4,541,297 A | | 9/1985 | Fujita | |
| 4,685,346 A | * | 8/1987 | Brackett | 74/465 |
| 4,741,220 A | * | 5/1988 | Watanabe et al. | 74/424.6 |
| 5,339,704 A | * | 8/1994 | Lindberg | 187/268 |
| 5,368,125 A | | 11/1994 | St-Germain | |
| 5,636,705 A | | 6/1997 | St-Germain | |
| 5,644,950 A | * | 7/1997 | Parsons | 74/465 |

FOREIGN PATENT DOCUMENTS

SU 1191408 A * 11/1985 .................. 187/250

* cited by examiner

Primary Examiner—Christopher P. Ellis
Assistant Examiner—Thuy V. Tran

(57) ABSTRACT

A driving apparatus includes a roller screw that includes a main shaft, a plurality of roller shafts projecting radially outwardly and upwardly at an angle from the radial direction of the main shaft and arranged along a helical line there around, and a plurality of rollers rotatably mounted on the roller shafts. The rollers are tapered to the same angle inwardly toward the main shaft. A rail member, adjacent to and axially oriented with the main shaft, includes a plurality of spaced projections adapted for radial engagement with the tapered rollers. The angle of the tapering is pre-determined to provide a sliding free engagement between the rollers and the projections with the interface there between being oriented to intersect the rotation axis of their respective roller shaft on the rotation axis of the main shaft. The rotation of the main shaft axially moves the roller screw relative to the rail member.

30 Claims, 8 Drawing Sheets

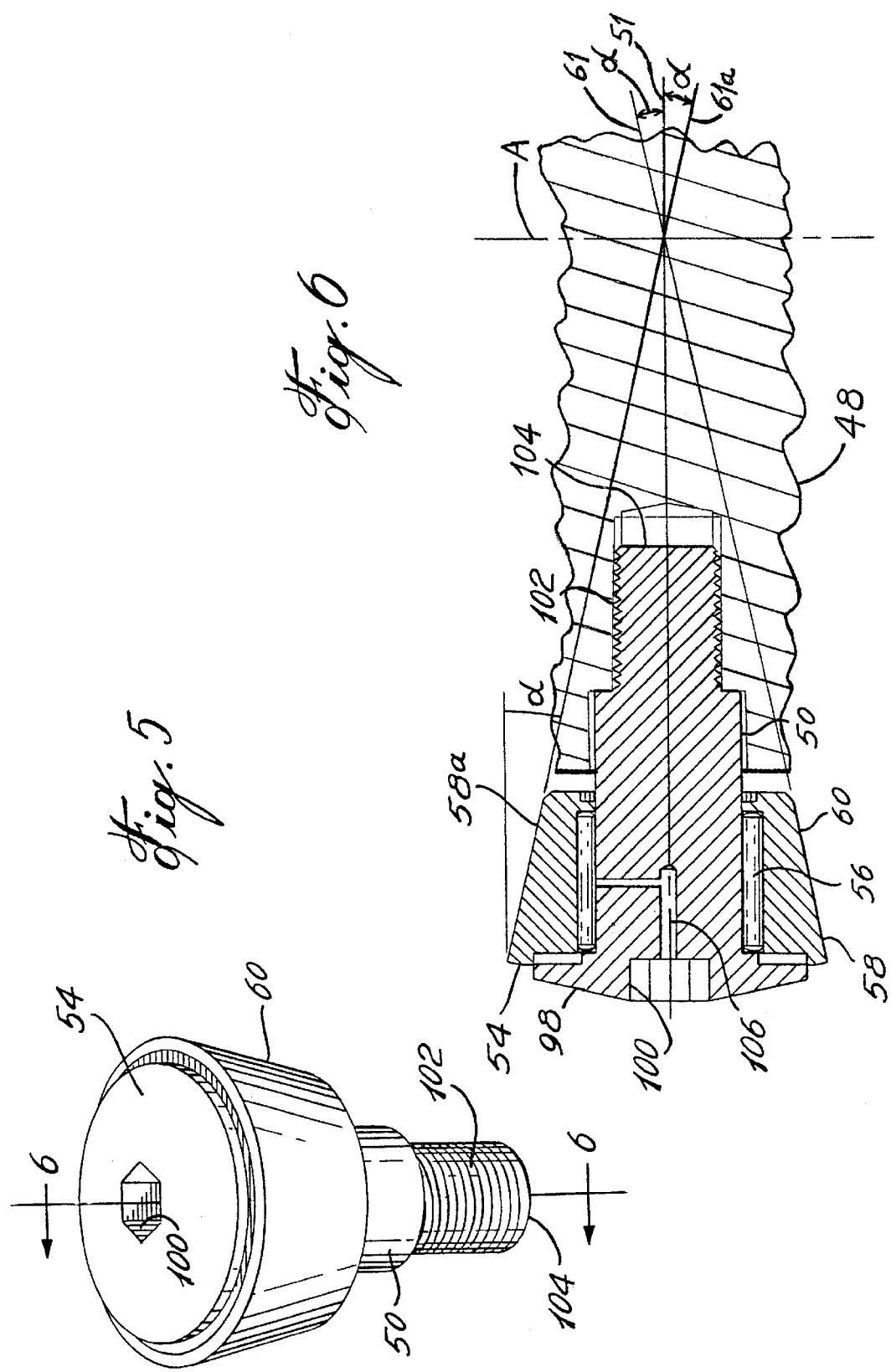

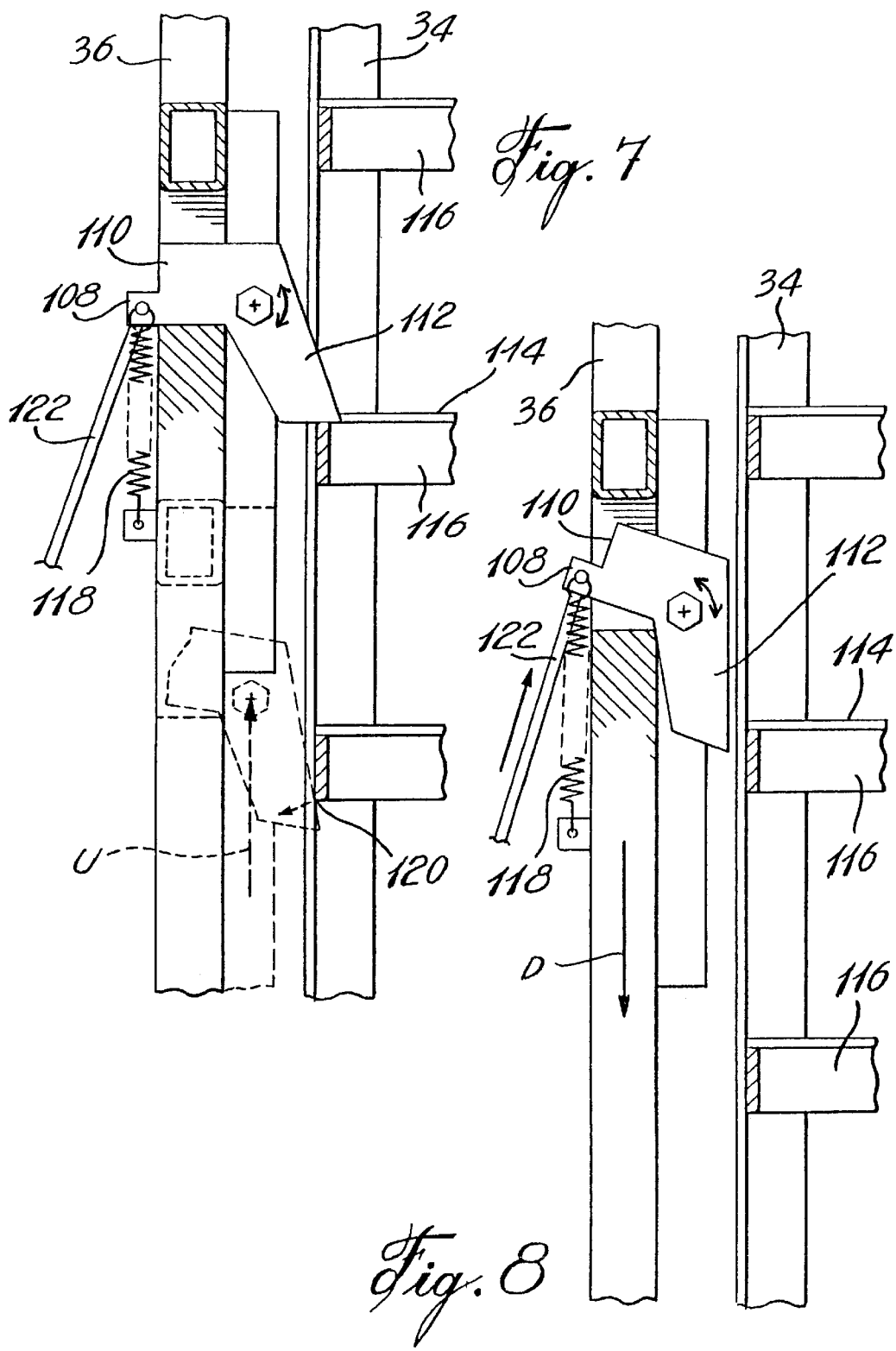

TAPERED ROLLER SCREW APPARATUS AND ITS DRIVEN DEVICE

CROSS-REFERENCE TO RELATED APPLICATION

This application is a Continuation-In-Part (C.I.P.) of application Ser. No. 09/114,923, filed on Jul. 14, 1998, now abandoned.

FIELD OF THE INVENTION

The present invention relates to driving apparatus, and more particularly to the driving apparatus using an endless screw having tapered rollers spacedly arranged along a helical line and rotatably engaging related projection surfaces mounted on the driven device.

BACKGROUND OF THE INVENTION

In driving mechanisms, it is well known to use a gear and rack type of assembly, especially when the driven part of the assembly is substantially heavy such as a work platform of scaffolding or an elevator cage. In some situations the load is so high, 1000 pounds and more, that a lot of drag torque will be caused by the friction between the gear and the different teeth of the rack. This drag torque might even be increased by dust depositions on the rack teeth.

To enhance the efficiency of the driving mechanism by smoothing the interface between the gear and the rack teeth is already known as shown in U.S. Pat. No. 4,541,297 granted on Sep. 17, 1985 to Fujita and U.S. Pat. No. 5,636,705 granted on Jun. 10, 1997 to St-Germain.

St-Germain shows a driving mechanism where the endless screw 80 engages with a plurality of equally spaced studs 50 forming the rack portion of the assembly, each stud 50 having a roller bearing mounted at its extremity.

Fujita shows an opposite driving mechanism where the endless screw is made with a cylindrical shaft proper 1 having a plurality of rollers 7 spaced along a helical line H mounted thereon. The rollers 7 engaging spaced projection 12 surfaces 13 representing the rack portion of the assembly.

Both of these mechanisms have a similar problem. Since the rollers have a certain thickness, they obviously have a large portion of their thickness that slides onto their respective engaging surface during the movement because of the varying radius from the axis of the endless gear, or shaft proper, of each engaging region between the roller and its engaging surface (or line). The sliding tends to deteriorate the surface of the weaker engaging material, thus considerably limiting the life of the driving mechanism. Also, the bearings being generally expensive, one would like to limit the replacement frequency of these, if they have the weaker engaging material. On the other hand, the replacement of either the endless screw or the rail projections of the driven structure is also an expensive situation.

OBJECTS OF THE INVENTION

It is an object of the present invention to provide a driving apparatus for linearly moving a structure that will obviate the above-noted disadvantages.

It is another object of this invention to provide a driving apparatus having at least two rollers simultaneously engaging projection surfaces.

It is also another object of this invention to provide a driving apparatus having the capability to drive its driven device into both directions of a linear movement.

It is a further object of this invention to provide a driving apparatus being driven by a hydraulic system that includes two hydraulic motors for increased load capabilities.

It is yet an object of this invention to provide a lifting driving apparatus being driven by a hydraulic system which includes a manual backup valve allowing for a safe and smooth descending movement upon failure of the hydraulic system.

It is yet another object of this invention to provide a structure including at least two lifting driving apparatus each being driven by an independent hydraulic system.

Other objects of the present invention will become apparent from a careful reading of the detailed description provided herein, with appropriate reference to the accompanying drawings.

SUMMARY OF THE INVENTION

According to an aspect of the present invention, there is provided a driving apparatus that comprises:

a roller screw member including a main shaft, a plurality of roller shafts projecting radially outwardly from the main shaft and arranged at equally spaced intervals along a helical line around the main shaft and, a plurality of rollers rotatably mounted on the roller shafts, the rollers including a bearing means for mounting the rollers on the roller shafts, the rollers being tapered to an angle, the rollers being oriented onto the roller shafts with the tapering inwardly to the main shaft; and a rail member adjacent and axially oriented with the main shaft of the roller screw member, the rail member including a plurality of equally spaced projections having inclined upper surfaces adapted for radial engagement with a bottom region of the tapered surfaces of the rollers, the inclination of the projection upper surfaces being equal to that of the helical line of the roller shafts of the roller screw member;

one of the roller screw and rail members being adapted for axial movement and the other of the roller screw and rail members being fixed against axial movement, the rotation of the main shaft providing the movable member to move in the axial direction of the main shaft with the bottom regions of the tapered surfaces of the rollers rotatably engaging the projection upper surfaces, the angle of the tapering being determined to have a projected extension of the tapered roller bottom regions intersecting an axis of their respective roller shaft on the axis of the main shaft, thereby providing a sliding free engagement between the roller surfaces and the projection upper surfaces during.

Preferably, the roller shafts projecting radially outwardly and upwardly at the angle from the radial direction from the main shaft thereby providing each roller with the bottom region of its tapered surface being generally perpendicularly oriented with the axis of the main shaft.

Alternatively, the projections of the rail member further having inclined lower surfaces adapted for radial engagement with a top region of the tapered surfaces of the respective rollers, the inclination of the projection lower surfaces being equal to that of the helical line of the roller shafts of the roller screw member, the opposite rotation of the main shaft providing the movable member to move in the opposite axial direction of the main shaft with the top regions of the tapered surfaces of the rollers rotatably engaging the projection lower surfaces, the angle of the tapering being determined to have a projected extension of the tapered roller top regions intersecting the axis of their respective roller shaft on the axis of the main shaft, thereby providing a sliding free engagement between the roller surfaces and the projection lower surfaces during opposite movement, the spacing between a projection upper surface and the facing lower surface of the adjacent projection being adapted to essentially freely receive the rollers thereby providing a smooth transition between the movements of the movable member along the axial direction and the opposite axial direction of the main shaft.

Preferably, the bearing means comprises roller bearings.

Preferably, the roller tapered surfaces are made of a material selected from the group consisting of metal, rubber and thermoplastics.

Preferably, the roller screw member is adapted for axial movement and the rail member is fixed against axial movement.

Alternatively, a second rail member adjacent the opposite side and axially oriented with the main shaft of the roller screw member.

Preferably, at least two rollers are being simultaneously rotatably engaging the projection upper surfaces at all time.

Preferably, the driving apparatus further comprises a structure member fixedly attached to the roller screw member, the structure member including a means for rotating the main shaft around its axis.

Alternatively, the means for rotating the main shaft being an electrical motor, the structure member further including a power source means connected to and a means for controlling the electrical motor whereby a user controllably operates the movement of the driving apparatus.

Preferably, the means for rotating the main shaft being a hydraulic motor located at one end of the main shaft, the structure member further including a hydraulic system linked to and a means for controlling the hydraulic motor whereby a user controllably operates the movement of the driving apparatus.

Preferably, the hydraulic system comprises a means for pressurizing a hydraulic liquid located into a reservoir and a plurality of hose lines and used to drive the hydraulic motor, a plurality of valve means for controlling the direction of the flow of hydraulic liquid within the lines, a plurality of relieve valve means for controlling the flow of hydraulic liquid, a flow limiting means to safely limit the maximum flow of the hydraulic liquid, the means for controlling the hydraulic motor being linked to the valve means and to the relieve valve means, the means for pressurizing being removably carried by the structure member.

Preferably, the driving apparatus is used to drive the roller screw member against at least one constant pulling force, the hydraulic system further comprises a manual backup valve bypassing the relieve valve means and operable by the user for safely and slowly allowing for the hydraulic liquid to circulate within the hydraulic motor thereby the movable member of the driving apparatus being pulled back by the constant pulling force.

Preferably, the hydraulic motor being a first hydraulic motor, the means for rotating further includes a second hydraulic motor located at the other end of the main shaft, the second hydraulic motor being linked in parallel with the first one within the hydraulic system to reduce the flow of the hydraulic liquid circulating into the motors thereby slowing down the axial movement and increasing the loading capacity of the driving apparatus.

Preferably, the means for pressurizing being an internal combustion engine driving a hydraulic pump and the constant pulling force being the gravitational force.

Preferably, the movable member further having a security brake member for mechanically preventing any relatively drastic axial movement of the movable member along the non-movable member, the brake member comprising a biased locking mechanism which engages the non-movable member at regular intervals therealong and a lever mechanism allowing for the user to unbias the locking mechanism whenever required.

Alternatively, the present invention provides, in combination, a platform member, a post member, and a driving apparatus movingly mounting the platform member along the post member, the driving apparatus being as above described. The rail member is removably attached to the post member and, the structure member, fixedly attached to the roller screw member and supporting the platform member, is at least partially surrounding the post member and includes a means for rotating the main shaft around its axis. The roller screw member being adapted for axial movement and the rail member being fixed against axial movement.

Alternatively, in the above combination, the projections of the rail member further having inclined lower surfaces adapted for radial engagement with a top region of the tapered surfaces of the respective rollers, the inclination of the projection lower surfaces being equal to that of the helical line of the roller shafts of the roller screw member, the opposite rotation of the main shaft providing the movable member to move in the opposite axial direction of the main shaft with the top region of the tapered surfaces of the rollers rotatably engaging the projection lower surfaces, the angle of the tapering being determined to have a projected extension of the tapered roller top regions intersecting the axis of their respective roller shaft on the axis of the main shaft, thereby providing a sliding free engagement between the roller surfaces and the projection lower surfaces during opposite movement, the spacing between a projection upper surface and the facing lower surface of the adjacent projection being adapted to essentially freely receive the rollers thereby providing a smooth transition between the movements of the movable member along the axial direction and the opposite axial direction of the main shaft.

Preferably, the above combination further includes a hydraulic system as above described.

Preferably, the structure member being relatively long to significantly enhance the structural rigidity of the post member especially against buckling, the structure member having a plurality of pair of free wheels rotatably mounted thereon, the free wheels bearing on the post member and guiding the structure member therealong.

Preferably, the platform member is a work platform.

Alternatively, the platform member is an elevator cage.

Preferably, the structure member further having a security brake member for mechanically preventing any relatively drastic axial movement of the movable member along the non-movable member, the brake member comprising a biased locking mechanism which engages the post member at regular intervals therealong and a lever mechanism allowing for the user to unbias the locking mechanism whenever required.

Alternatively, in a modified combination, the post member and the driving apparatus being a first post member and a first driving apparatus respectively, the combination further including at least a second post member spaced from the first post member, a second driving apparatus movingly mounting the platform member along the second post member, each structure member supporting one end of the platform member located inbetween the two post members.

Alternatively, the modified combination comprises at least two platform members, at least three post members and at least three driving apparatus, each of the platform members sharing a same post member positioned between the two of them.

BRIEF DESCRIPTION OF THE DRAWINGS

In the annexed drawings, like reference characters indicate like elements throughout.

FIG. 5 is an isometric view of a tapered roller mounted on its roller shaft;

FIG. 6 is a rotated sectional view taken along line 6—6 of FIG. 5, showing the roller mounted on the main shaft;

FIGS. 7 and 8 are side views of the security brake member taken along line 7—7 of FIG. 2 showing the security brake member in its locking operative position and unlatched non-operative position respectively.

DETAILED DESCRIPTION OF THE PREFERRED EMBODIMENTS

Figure 1:
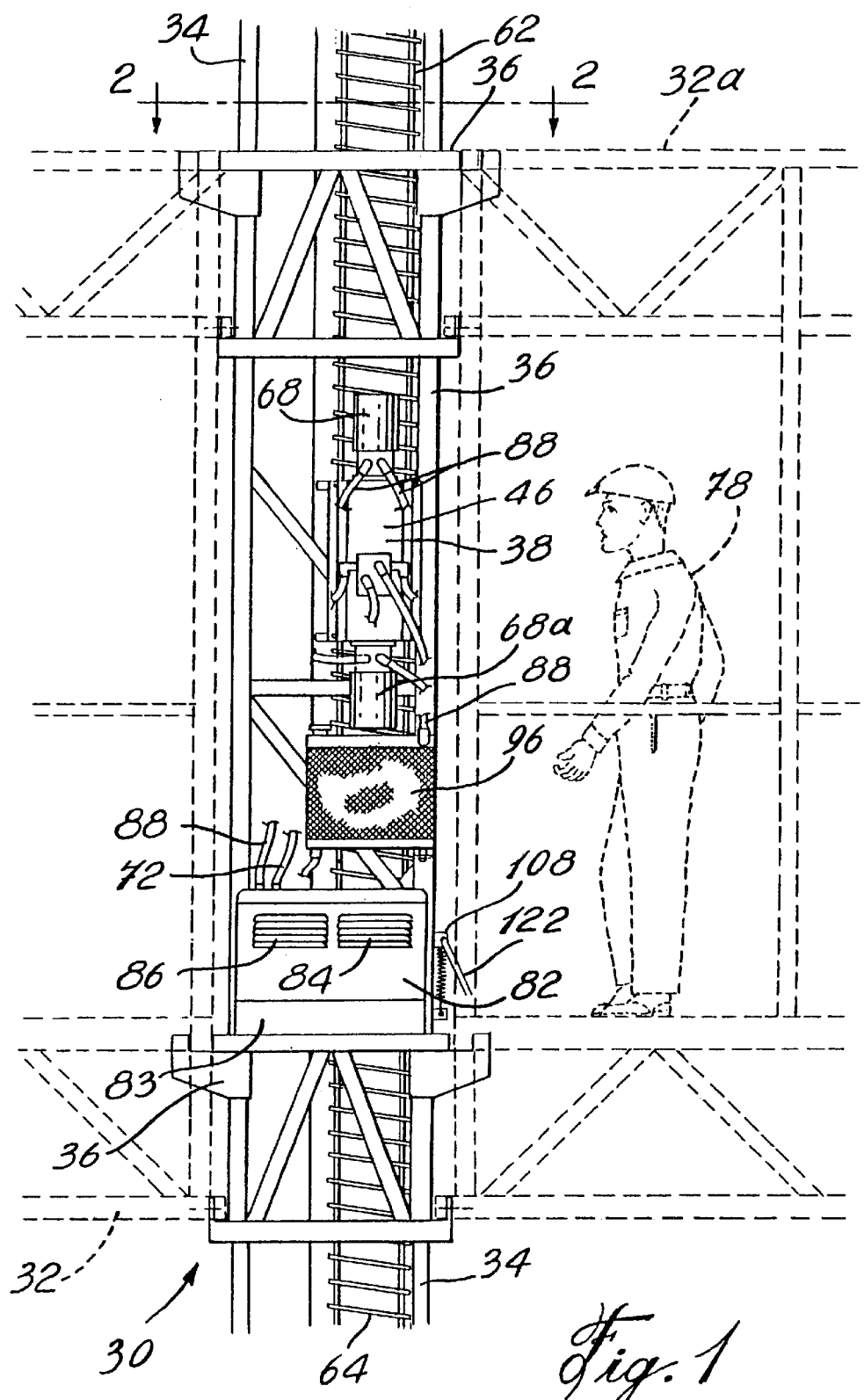
FIG. 1 is a front elevation view of the preferred embodiment of the driving apparatus of the present invention and its driven device, the post member being broken at both extremities.
Figure 2:
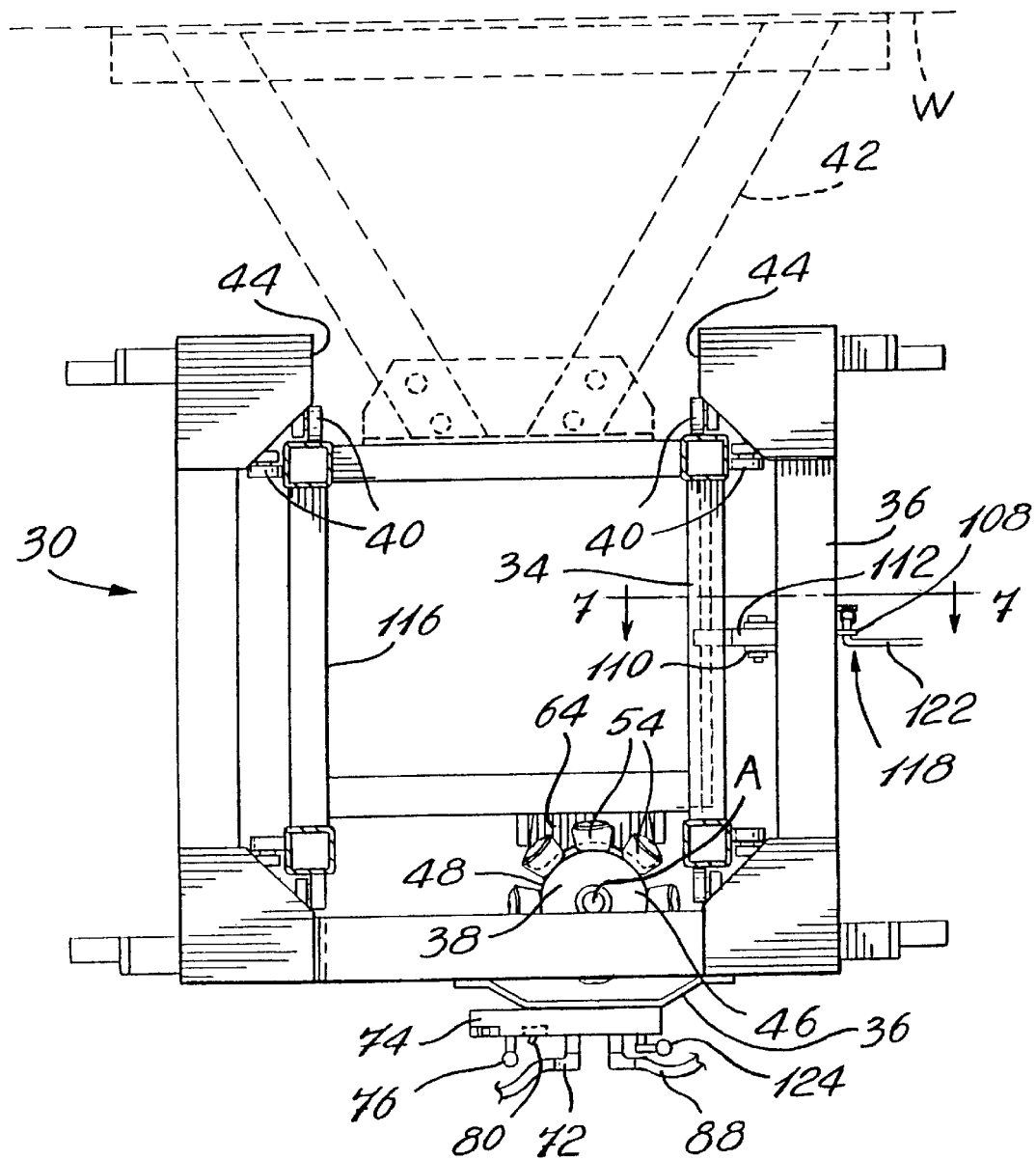
FIG. 2 is an enlarged top view taken along line 2—2 of FIG. 1.

Referring to FIGS. 1 to 8 there is shown a scaffolding structure 30 used to raise a work platform 32 along a post 34. From FIG. 1, the work platform 32 is supported by a structure member, preferably a sleeve 36, at least partially surrounding the post 34. Preferably, the sleeve 36 is moved along the post 34 using an embodiment of a driving apparatus 38 according to the present invention and, both the sleeve 36 and the post 34 have a generally square cross section, as seen in FIG. 2. A plurality of pairs of free wheels 40 rotatably mounted on the sleeve 36 bear on the post 34 and guide the sleeve 36 along the post 34 during the movement, as already illustrated in U.S. Pat. No. 5,636,705 to St-Germain. Depending on the overall length of the post 34, the latter may be secured to an adjacent building wall W via a plurality of anchor members 42 spacedly located along the post 34. The sleeve 36 has a longitudinal slit 44 opened at both ends for clearing the anchor members 42 during its vertical movement along the post 34. The sleeve 36 is also preferably long to significantly enhance the structural rigidity of the post 34, especially against buckling and, allowing for support of a second work platform 32a if required. The post 34 is adapted to be removably mounted at its base onto a support structure (not shown) adapted to rigidly support the weight of the whole scaffolding structure 30.

Figure 3:
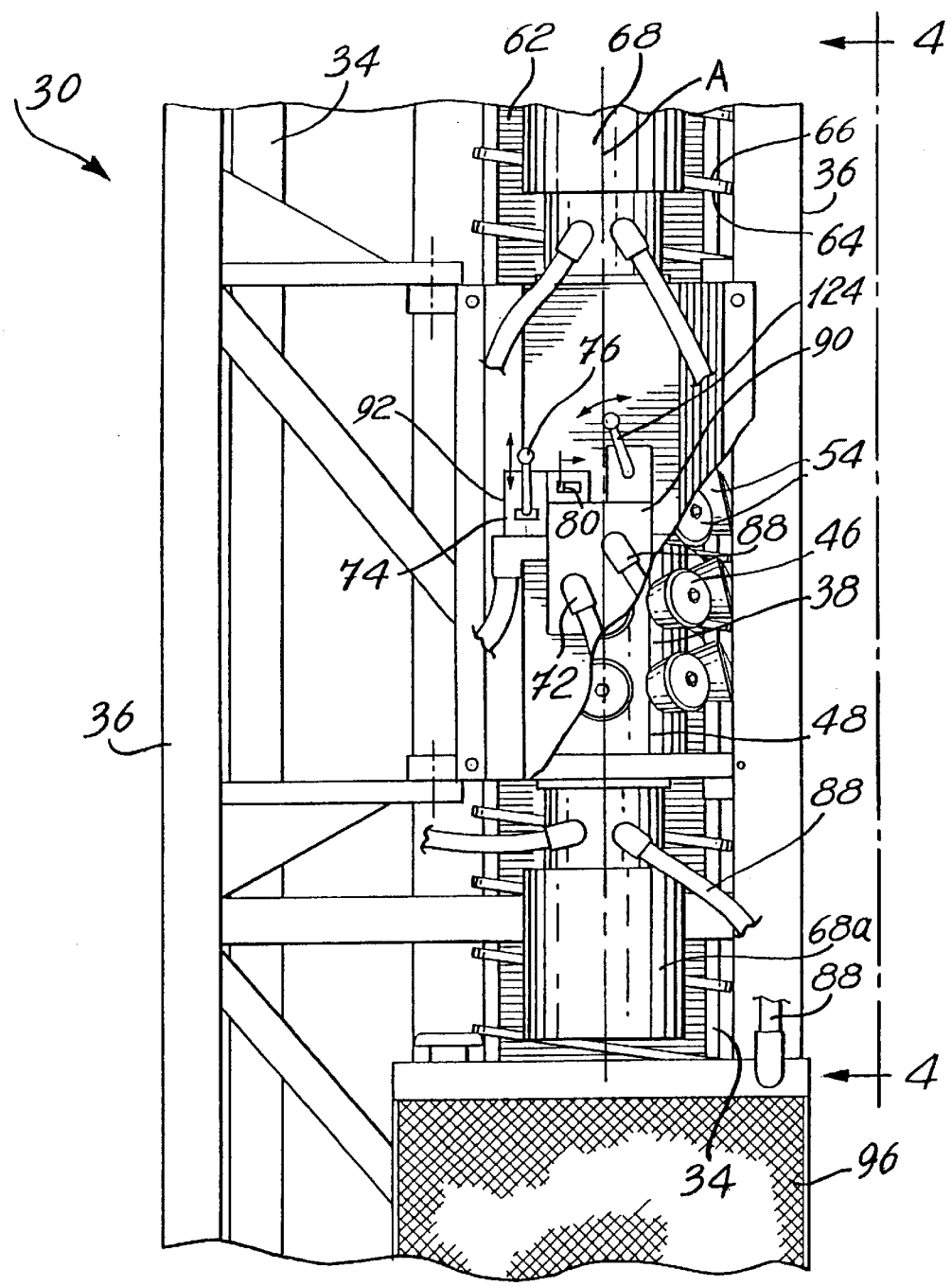
FIG. 3 is a partially broken enlarged front view of the driving apparatus.
Figure 4:
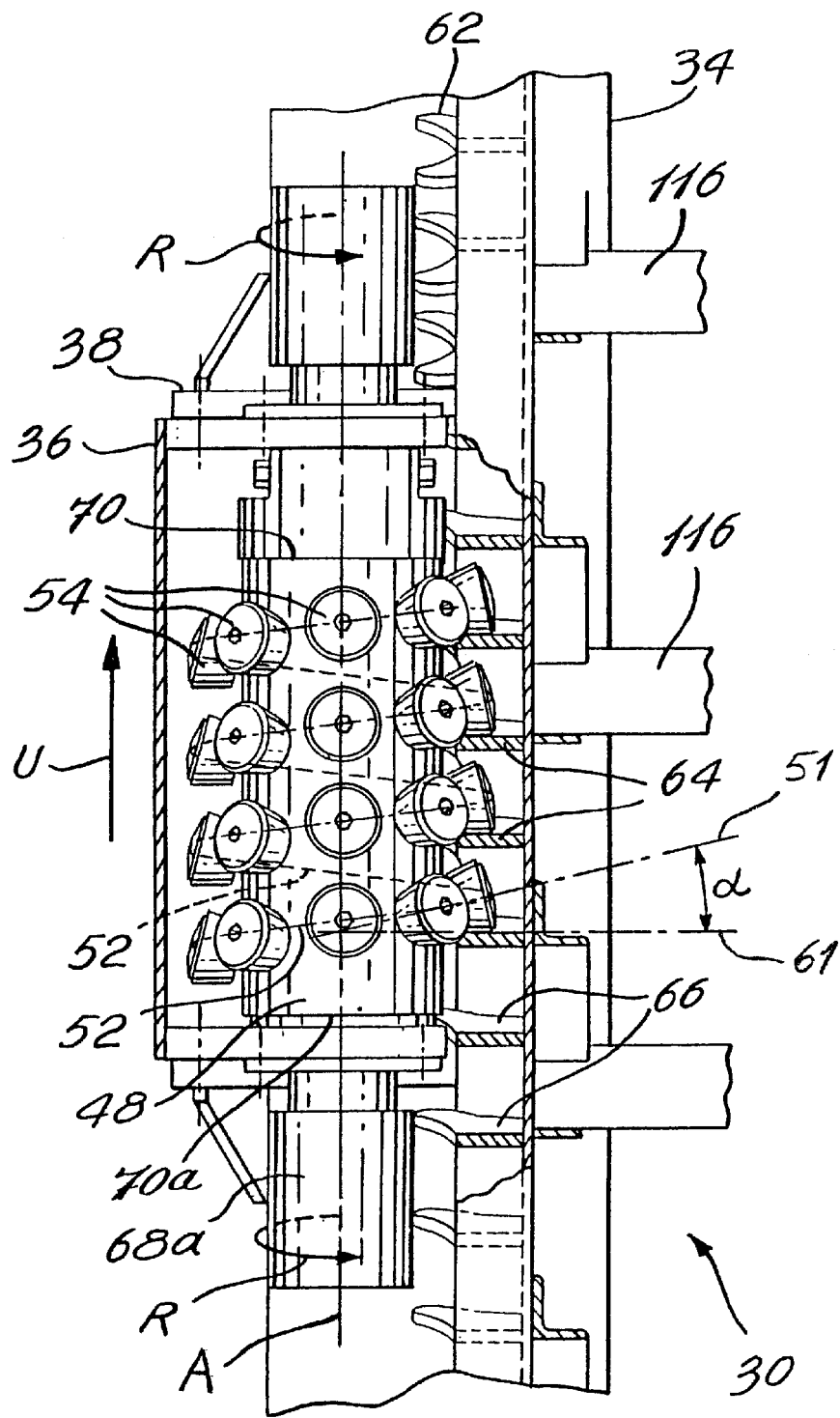
FIG. 4 is a partially broken enlarged side view taken along line 4—4 of FIG. 3.

As shown in FIGS. 3 and 4, the driving apparatus 38 comprises a roller screw member 46 that is preferably mounted onto the sleeve 36. The driving apparatus 38 includes a main shaft 48, a plurality of roller shafts 50 (better shown in FIG. 5) projecting radially outwardly and preferably upwardly at an angle from the radial direction from the main shaft 48. The roller shafts 50 are preferably arranged at equally spaced intervals along a helical line 52 around the main shaft 48 and its axis A. A roller 54 is rotatably mounted, preferably using a roller bearing 56, at the projected extremity of each roller shafts 50. The rollers 54 are tapered, preferably to the angle α, and are oriented onto the roller shafts 50 with the tapering inwardly to the main shaft 48 in order to have the bottom region 58 of their tapered surfaces 60 being generally perpendicularly oriented with the axis A of the main shaft 48, and their projected extensions 61 intersecting the axis 51 of the respective roller shaft 50 on that same axis A of the main shaft 48.

The driving apparatus 38 also includes a rail member 62 adjacent and axially oriented with the main shaft 48. The rail member 62, preferably removably mounted onto the post 34, includes a plurality of equally spaced projections 64 having inclined upper surfaces 66 adapted for radial engagement with the bottom region 58 of the tapered surfaces 60 of the rollers 54. The inclination of the projection upper surfaces 66 is equal to that of the helical line 52 of the roller shafts 54 on the main shaft 48. Preferably, both the roller tapered surfaces 60 and the projection upper surfaces 66 are made out of a relatively hard metal such as high strength steel. Depending on the loading of the driving apparatus 38, the material may also be rubber or a thermoplastic.

The rotation R of the main shaft 48 with the rollers 54 induces its vertical displacement in the axial direction U of the main shaft 48 with the tapered roller bottom regions 58 rotatably engaging the projection upper surfaces 66. The angle α of the tapering is determined to provide a sliding free engagement between the roller surfaces 60 and the projection upper surfaces 66 during movement. Accordingly, the projected extensions 61 of the bottom region 58 of the roller surfaces 60 intersect the axis 51 of their respective roller shaft 50 at the axis A of the main shaft 48, as shown in FIGS. 4 and 6.

During the movement of the roller screw member 46 onto the rail member 62, it is preferable to have at least eight (8) rollers 54 simultaneously engaging the projections 64 at all time for smoother engagement.

In FIG. 3, there is shown a means for rotating the main shaft 48, preferably a hydraulic motor 68 coaxially mounted on the top end 70 of the main shaft 48, fixedly attached to the sleeve 36. Also, the structure member includes a hydraulic system 72 linked to the hydraulic motor 68 and a means for controlling 74 the hydraulic motor 68. The means for controlling 74 is preferably a manual lever 76 operated by a user 78 and allows for variable speed of the hydraulic motor 68. To increase the loading capacity of the driving apparatus 38, a second hydraulic motor 68a is preferably coaxially mounted on the bottom end 70a of the main shaft 48. The second motor 68a is linked in parallel with the first motor 68 within the hydraulic system 72, and is activated by a two position switch 80 controlled by the user 78.

Figure 9:
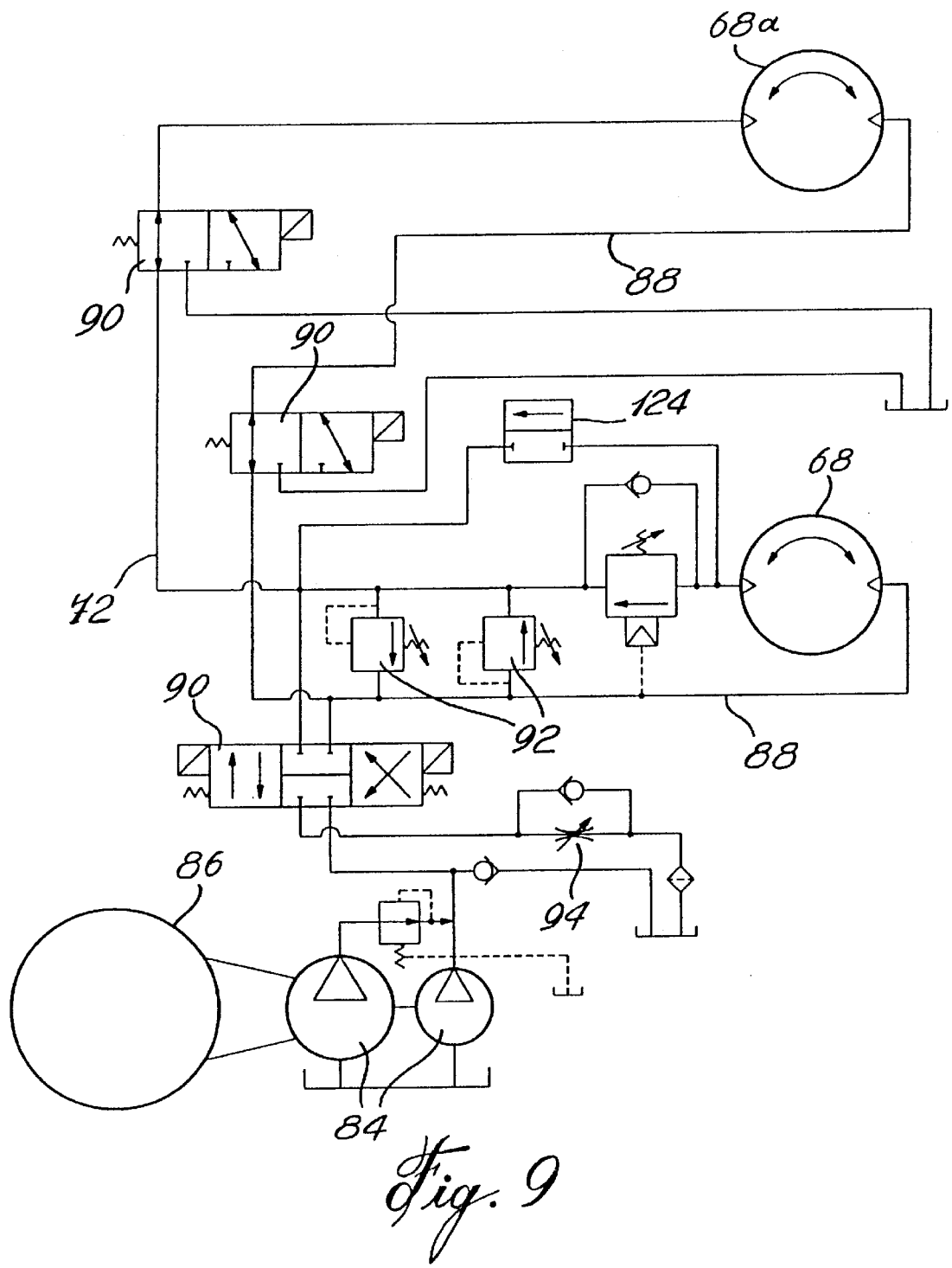
FIG. 9 is a schematic diagram representation of the hydraulic system of the driving apparatus.

The hydraulic system 72, partially shown in FIG. 3, comprises a means for pressurizing 82 the hydraulic liquid located into a reservoir 83, preferably including a hydraulic dual stage pump 84 and an internal combustion engine 86 driving the hydraulic pump 84, a plurality of hose lines 88 to circulate the hydraulic liquid from the reservoir 83 to the hydraulic motors 68, 68a in a closed loop and connecting a plurality of valve means, preferably electrical valves 90, to control the circulation of the hydraulic liquid within the lines 88, a plurality of relieve valve means 92 for controlling the flow of the hydraulic liquid thereby varying the speed of the hydraulic motor 68, and a flow limiting means 94 to safely limit the maximum flow of hydraulic liquid. Since the hydraulic liquid does heat up very quickly under prolonged utilization, a radiator 96 is provided within the hydraulic system 72 to cool down the hydraulic liquid. The hydraulic system 72 is schematically represented in FIG. 9.

In FIG. 5, there is shown a roller 54 mounted on its roller shaft 50. At the roller side extremity 98 of the roller shaft 50, there is a centered and preferably hexagonal cavity 100 used to screw down the roller shaft 50 into the main shaft 48 with the threads 102 located at the other extremity 104 of the roller shaft 50. Also, as seen in FIG. 6, there is a small angular channel 106 connecting the roller bearing 56 to the hexagonal cavity 100. The small channel 106 is used during periodical maintenance of the bearing 56 for lubrication. The tapering at the angle α of the roller 54 is well illustrated in this figure, for a second embodiment of the driving apparatus 38a described herebelow.

Since the driving apparatus 38 drives the sleeve 36 supporting the work platform 32 upward against the constant pulling force of gravity, the sleeve 36 also includes a security brake member 108 for mechanically preventing drastic downward axial movement of the sleeve 36 and the work platform 32 in case of failure of the hydraulic system 72. The security brake member 108, as shown in FIG. 7, preferably includes a locking mechanism 110 comprising a hook 112 pivotally mounted on the sleeve 36 which abuttingly engages a series of relatively regularly spaced stops, preferably the top surfaces 114 of cross beams 116, located along the post 34, with a biasing member 118, preferably a coil spring, for maintaining the hook 112 in its hooking position. During normal upward movement U of the sleeve 36 along the post 34, the hook 112 is automatically moved into the unhooking position while crossing the next cross beam 116 and abutting its bottom surface 120, as shown in broken lines in FIG. 7. During the downward movement D of the sleeve, the user can pivot the hook 112 against the biasing member 118 and keep it into its unhooking position via a lever 122, as shown in FIG. 8.

The hydraulic system 72 also includes a manual backup valve 124 for the hydraulic liquid to bypass the different relieve valves means 92 and circulate through the hydraulic motors 68, 68a, and allowing for a safe and slow downward movement D of the sleeve 36 and the platform 32 under the gravity force in case of a problem with the hydraulic system 72. The user 78 via a backup lever 126 preferably operates this manual backup valve 124.

Figure 4A:
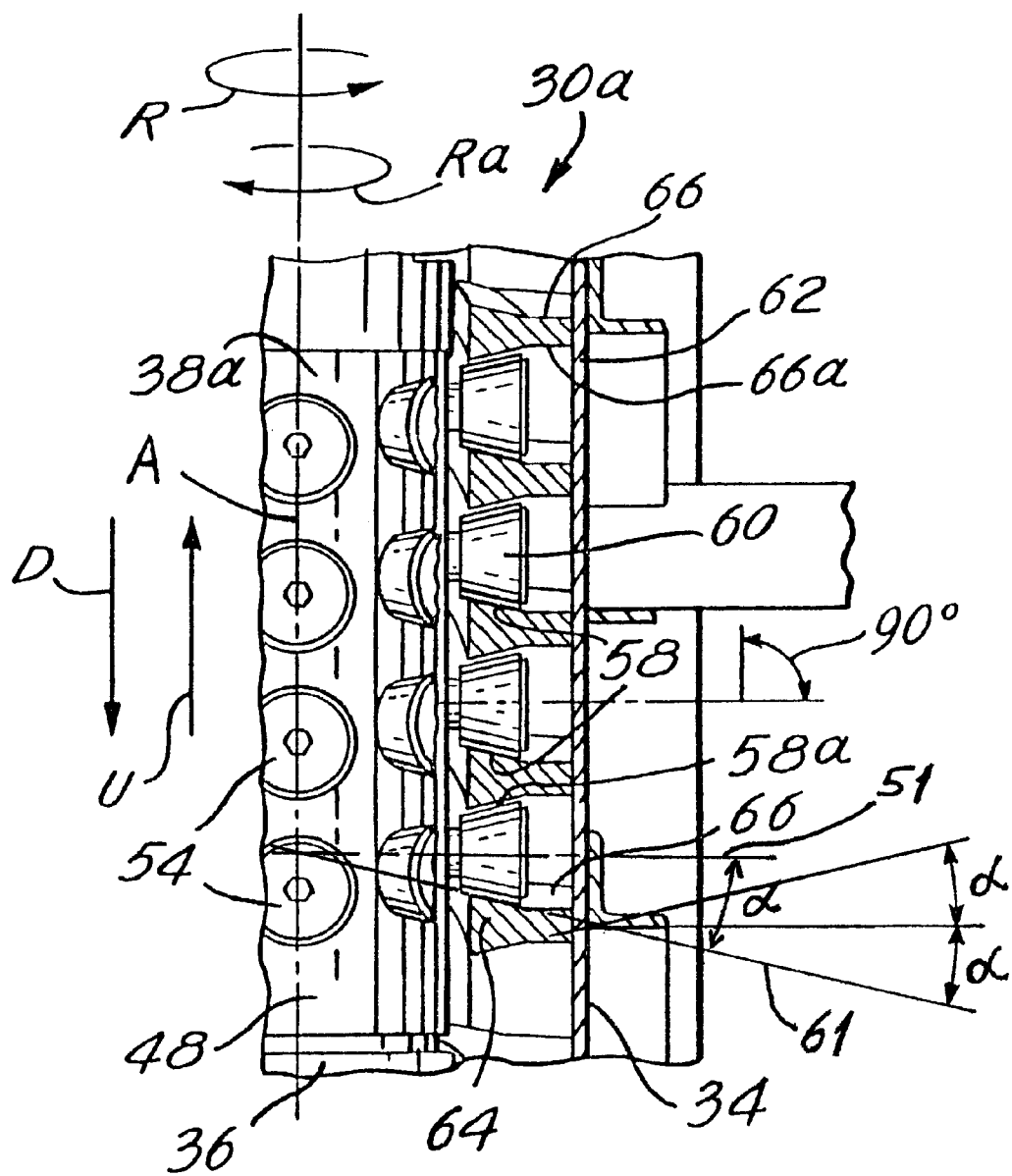
FIG. 4a is a view similar to that of FIG. 4 showing a second embodiment of the driving apparatus being able to drive into the two opposed linear directions.

In a second embodiment of this invention of the driving apparatus 38a of a scaffolding 30a, as shown in FIG. 4a and partially illustrated in FIG. 6, the roller shafts 50 are projected radially outwardly from the main shaft 48 and their axes 51 are perpendicular to the axis A of the main shaft 48. Also, the projections 64 have inclined lower surfaces 66a adapted for radial engagement with the top regions 58a of the tapered surfaces 60 of the rollers 54. The inclination of the projection lower surfaces 66a in the tangential direction of the main shaft 48 being also equal to that of the helical line 52 of the roller shafts 54 on the main shaft 48. The opposite rotation Ra of the main shaft 48 with the rollers 54 induces its vertical displacement in the opposite axial direction D of the main shaft 48 with the tapered roller top regions 58a rotatably engaging the projection lower surfaces 66a. The angle α of the tapering also provides a sliding free engagement between the roller surfaces 60 and the projection lower surfaces 66a during opposite movement. This orientation of the axes 51 of the roller shafts 50 with the projection upper 66 and lower 66a surfaces being both adapted at the angle α to engage the bottom 58 and top 58a regions of the tapered surfaces 60 of the rollers 54 respectively. Accordingly, the projected extensions 61, 61a of the bottom 58 and top 58a regions respectively intersect the axis 51 of their respective roller shaft 50 on the axis A of the main shaft 48. The spacing between a projection upper surface 66 and the facing lower surface 66a of the adjacent projection is adapted to essentially freely receive the rollers 54 and provides a smooth transition between the two direction movements of the sleeve 36 and the work platform 32 along the axial direction U and the opposite axial direction D of the main shaft 48. This embodiment is particularly adapted for situations where both the axis A of the main shaft 48 and the rail member 62 are substantially horizontally oriented.

In a further embodiment of a scaffolding, the scaffolding comprises a work platform 32 with at least two ends, each end of the work platform 32 is supported by its related sleeve 36 combined with its related driving apparatus 38 and post 34. The work platform 32 being located inbetween the two posts 34. In the same manner, other embodiments can be obtained such as scaffoldings comprising at least two work platforms 32, at least three posts 34 and at least three driving apparatus 38 with their respective sleeves 36, each of the work platforms 32 sharing a same post 34 positioned between the two of them.

Also, the present invention is not limited to scaffoldings, it can also be used for different types of elevators or in any situation where a platform member needs to be driven along a linear direction.

Although embodiments of the invention have been illustrated in the accompanying drawings and described in the foregoing detailed description, it will be understood that the invention is not limited to the embodiments disclosed, but is capable of numerous rearrangements, modifications, and substitutions without departing from the scope of the invention.

We claim:

1. A driving apparatus, comprising:

a roller screw member including a main shaft, a plurality of roller shafts projecting radially outwardly from the main shaft and arranged at equally spaced intervals along a helical line around the main shaft and, a plurality of rollers rotatably mounted on the roller shafts, the rollers including a bearing means for mounting the rollers on the roller shafts, the rollers being tapered to an angle, the rollers being oriented onto the roller shafts with the tapering inwardly to the main shaft; and a rail member adjacent and axially oriented with the main shaft of the roller screw member, the rail member including a plurality of equally spaced projections having inclined upper surfaces adapted for radial engagement with a bottom region of the tapered surfaces of the rollers, the inclination of the projection upper surfaces being equal to that of the helical line of the roller shafts of the roller screw member;

one of the roller screw and rail members being adapted for axial movement and the other one of the roller screw and rail members being fixed against axial movement, the rotation of the main shaft providing a movable member to move in the axial direction of the main shaft with the bottom regions of the tapered surfaces of the rollers rotatably engaging the projection upper surfaces, the angle of the tapering being determined to have a projected extension of the tapered roller bottom regions intersecting a rotation axis of their respective roller shaft on the rotation axis of the main shaft, thereby providing a sliding free engagement between the roller surfaces and the projection upper surfaces during movement.

2. A driving apparatus as defined in claim 1, wherein the roller shafts projecting radially outwardly and upwardly at the angle from the radial direction from the main shaft thereby providing each roller with the bottom region of its tapered surface being generally perpendicularly oriented with the axis of the main shaft.

3. A driving apparatus as defined in claim 1, wherein the projections of the rail member further having inclined lower surfaces adapted for radial engagement with a top region of the tapered surfaces of the respective rollers, the inclination of the projection lower surfaces being equal to that of the helical line of the roller shafts of the roller screw member, the opposite rotation of the main shaft providing the movable member to move in the opposite axial direction of the main shaft with the top regions of the tapered surfaces of the rollers rotatably engaging the projection lower surfaces, the angle of the tapering being determined to have a projected extension of the tapered roller top regions intersecting the axis of their respective roller shaft on the axis of the main shaft, thereby providing a sliding free engagement between the roller surfaces and the projection lower surfaces during opposite movement, the spacing between a projection upper surface and the facing lower surface of the adjacent projection being adapted to essentially freely receive the rollers thereby providing a smooth transition between the movements of the movable member along the axial direction and the opposite axial direction of the main shaft.

4. A driving apparatus as defined in claim 1, wherein the bearing means comprises roller bearings.

5. A driving apparatus as defined in claim 1, wherein the roller tapered surfaces are made of a material selected from the group consisting of metal, rubber and thermoplastics.

6. A driving apparatus as defined in claim 1, wherein the roller screw member is adapted for axial movement and the rail member is fixed against axial movement.

7. A driving apparatus as defined in claim 1, wherein at least two rollers are being simultaneously rotatably engaging the projection upper surfaces at all time.

8. A driving apparatus as defined in claim 1, wherein a second rail member adjacent the opposite side and axially oriented with the main shaft of the roller screw member.

9. A driving apparatus as defined in claim 1, further comprising a structure member fixedly attached to the roller screw member, the structure member including a means for rotating the main shaft around its axis.

10. A driving apparatus as defined in claim 9, wherein the means for rotating the main shaft being an electrical motor, the structure member further including a power source means connected to the electrical motor and a means for controlling the electrical motor whereby a user controllably operates the movement of the driving apparatus.

11. A driving apparatus as defined in claim 9, wherein the means for rotating the main shaft being a hydraulic motor located at one end of the main shaft, the structure member further including a hydraulic system linked to the hydraulic motor and a means for controlling the hydraulic motor whereby a user controllably operates the movement of the driving apparatus.

12. A driving apparatus as defined in claim 11, wherein the hydraulic system comprises a means for pressurizing a hydraulic liquid located into a reservoir and a plurality of hose lines and used to drive the hydraulic motor, a plurality of valve means for controlling the direction of the flow of hydraulic liquid within the lines, a plurality of relieve valve means for controlling the flow of hydraulic liquid, a flow limiting means to safely limit the maximum flow of the hydraulic liquid, the means for controlling the hydraulic motor being linked to the valve means and to the relieve valve means, the means for pressurizing being removably carried by the structure member.

13. A driving apparatus as defined in claim 12, wherein the driving apparatus is used to drive the movable member against at least one constant pulling force, the hydraulic system further comprises a manual backup valve bypassing the relieve valve means and operable by the user for safely and slowly allowing for the hydraulic liquid to circulate within the hydraulic motor thereby the movable member of the driving apparatus being pulled back by the constant pulling force.

14. A driving apparatus as defined in claim 13, wherein the hydraulic motor being a first hydraulic motor, the means for rotating further includes a second hydraulic motor located at the other end of the main shaft, the second hydraulic motor being linked in parallel with the first one within the hydraulic system to reduce the flow of the hydraulic liquid circulating into the motors thereby slowing down the axial movement and increasing the loading capacity of the driving apparatus.

15. A driving apparatus as defined in claim 13, wherein the means for pressurizing being an internal combustion engine driving a hydraulic pump and the constant pulling force being the gravitational force.

16. A driving apparatus as defined in claim 15, wherein the movable member further having a security brake member for mechanically preventing any relatively drastic axial movement of the movable member along a non-movable member, the brake member comprising a biased locking mechanism which engages the non-movable member at regular intervals therealong and a lever mechanism allowing for the user to unbias the locking mechanism whenever required.

17. In combination, a platform member, a post member, and a driving apparatus movingly mounting the platform member along the post member, the driving apparatus comprising:

a roller screw member including a main shaft, a plurality of roller shafts projecting radially outwardly from the main shaft and arranged at equally spaced intervals along a helical line around the main shaft and, a plurality of rollers rotatably mounted on the roller shafts, the rollers including a bearing means for mounting the rollers on the roller shafts, the rollers being tapered to an angle, the rollers being oriented onto the roller shafts with the tapering inwardly to the main shaft;

a rail member adjacent and axially oriented with the main shaft of the roller screw member, the rail member including a plurality of equally spaced projections having inclined upper surfaces adapted for radial engagement with a bottom region of the tapered surfaces of the respective rollers, the inclination of the projection upper surfaces being equal to that of the helical line of the roller shafts of the roller screw member, the rail member being removably attached to the post member; and a structure member fixedly attached to the roller screw member and supporting the platform member, the structure member at least partially surrounding the post member and including a means for rotating the main shaft around its axis;

one of the roller screw and rail members being adapted for axial movement and the other one of the roller screw and rail members being fixed against axial movement, the rotation of the main shaft providing the roller screw member with the platform member to move in the axial direction of the main shaft along the post member with the bottom regions of the tapered surfaces of the rollers rotatably engaging the projection upper surfaces, the angle of the tapering being determined to have a projected extension of the tapered roller bottom regions intersecting a rotation axis of their respective roller shaft on the rotation axis of the main shaft, thereby providing a sliding free engagement between the roller surfaces and the projection upper surfaces during movement.

18. The combination of claim 17, wherein the roller shafts projecting radially outwardly and upwardly at the angle from the radial direction from the main shaft thereby providing each roller with the bottom region of its tapered surface being generally perpendicularly oriented with the axis of the main shaft.

19. The combination of claim 17, wherein the projections of the rail member further having inclined lower surfaces adapted for radial engagement with a top region of the tapered surfaces of the respective rollers, the inclination of the projection lower surfaces being equal to that of the helical line of the roller shafts of the roller screw member, the opposite rotation of the main shaft providing the movable member to move in the opposite axial direction of the main shaft with the top regions of the tapered surfaces of the rollers rotatably engaging the projection lower surfaces, the angle of the tapering being determined to have a projected extension of the tapered roller top regions intersecting the axis of their respective roller shaft on the axis of the main shaft, thereby providing a sliding free engagement between the roller surfaces and the projection lower surfaces during opposite movement, the spacing between a projection upper surface and the facing lower surface of the adjacent projection being adapted to essentially freely receive the rollers thereby providing a smooth transition between the movements of the movable member along the axial direction and the opposite axial direction of the main shaft.

20. The combination of claim 17, wherein the structure member being relatively long to significantly enhance the structural rigidity of the post member especially against buckling, the structure member having a plurality of pair of free wheels rotatably mounted thereon, the free wheels bearing on the post member and guiding the structure member therealong.

21. The combination of claim 17, wherein the means for rotating the main shaft being a hydraulic motor located at one end of the main shaft, the structure member further including a hydraulic system linked to the hydraulic motor and a means for controlling the hydraulic motor whereby a user controllably operates the movement of the driving apparatus.

22. The combination of claim 21, wherein the hydraulic system comprises a means for pressurizing a hydraulic liquid located into a reservoir and a plurality of hose lines and used to drive the hydraulic motor, a plurality of valve means for controlling the direction of the flow of hydraulic liquid within the lines, a plurality of relieve valve means for controlling the flow of hydraulic liquid, a flow limiting means to safely limit the maximum flow of the hydraulic liquid, the means for controlling the hydraulic motor being linked to the valve means and to the relieve valve means, the means for pressurizing being removably carried by the structure member.

23. The combination of claim 22, wherein the driving apparatus is used to drive the movable member against at least one constant pulling force, the hydraulic system further comprises a manual backup valve bypassing the relieve valve means and operable by the user for safely and slowly allowing for the hydraulic liquid to circulate within the hydraulic motor thereby the movable member of the driving apparatus being pulled back by the constant pulling force.

24. The combination of claim 23, wherein the hydraulic motor being a first hydraulic motor, the means for rotating further includes a second hydraulic motor located at the other end of the main shaft, the second hydraulic motor being linked in parallel with the first one within the hydraulic system to reduce the flow of the hydraulic liquid circulating into the motors thereby slowing down the axial movement and increasing the loading capacity of the driving apparatus.

25. The combination of claim 24, wherein the platform member being a work platform, the post member and the structure member having a generally square cross section, the means for pressurizing being an internal combustion engine driving a hydraulic pump and, the constant pulling force being the gravitational force.

26. The combination of claim 24, wherein the platform member being an elevator cage and the constant pulling force being the gravitational force.

27. The combination of claim 21, wherein the structure member having a plurality of pair of free wheels rotatably mounted thereon, the free wheels bearing on the post member and guiding the structure member therealong.

28. The combination of claim 27, wherein the structure member further having a security brake member for mechanically preventing any relatively drastic axial movement of the movable member along the non-movable member, the brake member comprising locking mechanism which engages the post member at regular intervals theralong and a lever mechanism allowing for the user to unibias the locking mechanism whenever required.

29. The combination of claim 21, wherein the post member and the driving apparatus being a first post member and a first driving apparatus respectively, the combination further including at least a second post member spaced from the first post member, a second driving apparatus movingly mounting the platform member along the second post member, each structure member supporting one end of the platform member located inbetween the two post members.

30. The combination of claim 25 comprising at least two platform members, at least three post members and at least three driving apparatus, each of the platform members sharing a same post member positioned between the two of them.

* * * * *